(12) United States Patent
Almalki et al.

(10) Patent No.: US 8,436,806 B2
(45) Date of Patent: May 7, 2013

(54) METHOD OF SYNCHRONIZING DATA ACQUISITION AND A PORTABLE ELECTRONIC DEVICE CONFIGURED TO PERFORM THE SAME

(75) Inventors: Nazih Almalki, Waterloo (CA); Sean Bartholomew Simmons, Waterloo (CA)

(73) Assignee: Research In Motion Limited, Waterloo (CA)

( * ) Notice: Subject to any disclaimer, the term of this patent is extended or adjusted under 35 U.S.C. 154(b) by 606 days.

(21) Appl. No.: 12/572,664

(22) Filed: Oct. 2, 2009

(65) Prior Publication Data
US 2011/0080350 A1    Apr. 7, 2011

(51) Int. Cl.
G09G 3/36    (2006.01)

(52) U.S. Cl.
USPC .......................................... 345/104; 345/173

(58) Field of Classification Search .................. 345/104, 345/173–175; 178/18.01–18.05, 19.01–19.03
See application file for complete search history.

(56) References Cited

U.S. PATENT DOCUMENTS

| 2003/0210235 A1 | 11/2003 | Roberts |
| 2005/0146511 A1 | 7/2005 | Hill et al. |
| 2006/0181517 A1 | 8/2006 | Zadesky et al. |
| 2007/0077541 A1* | 4/2007 | Champagne et al. ........... 434/62 |
| 2007/0080951 A1* | 4/2007 | Maruyama et al. ........... 345/173 |
| 2008/0158177 A1 | 7/2008 | Wilson et al. |
| 2009/0046069 A1 | 2/2009 | Griffin et al. |
| 2011/0080349 A1* | 4/2011 | Holbein et al. ............... 345/173 |
| 2011/0080367 A1* | 4/2011 | Marchand et al. ........... 345/174 |
| 2011/0300935 A1* | 12/2011 | Yoshikawa et al. ............. 463/31 |

FOREIGN PATENT DOCUMENTS

| GB | 2 138 567 A | 10/1984 |
| GB | 2402105 | 12/2004 |
| WO | WO 03096266 | 11/2003 |
| WO | WO 2010033522 | 3/2010 |

OTHER PUBLICATIONS

EESR of the corresponding EP Patent Application No. 09172143.1 dated Feb. 12, 2010.
International Search Report related to PCT/CA2010/001519; Dated Dec. 16, 2010; 3 pages.
Communication pursuant to Article 94(3) EPC; Oct. 31, 2012; EP 09172143.1.
Extended European Search Report; Nov. 2, 2012; EP 12177367.5.

* cited by examiner

Primary Examiner — Ricardo L Osorio
(74) Attorney, Agent, or Firm — Ridout & Maybee LLP

(57) ABSTRACT

A method of synchronizing force data with touch data and a portable electronic device configured to perform the same are provided. In accordance with one embodiment, there is provided a method of synchronizing data acquisition in a portable electronic device, the method comprising: detecting touch events on a touch-sensitive display and storing touch data for each touch event with a time stamp for the touch event; detecting force events on the touch-sensitive display and storing force data for each force event with a time stamp for the force event; matching touch data for a particular touch event with force data for a force event corresponding to the particular touch event; and outputting the matched touch data and force data for input processing operations.

37 Claims, 7 Drawing Sheets

METHOD OF SYNCHRONIZING DATA ACQUISITION AND A PORTABLE ELECTRONIC DEVICE CONFIGURED TO PERFORM THE SAME

TECHNICAL FIELD

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. The power consumed by touch-sensitive displays is a relatively large portion of the total power draw for the device. Accordingly, improvements which reduce the power consumption of touch-sensitive displays of portable electronic devices are desirable.

DETAILED DESCRIPTION OF EXAMPLE EMBODIMENTS

Figure 1:
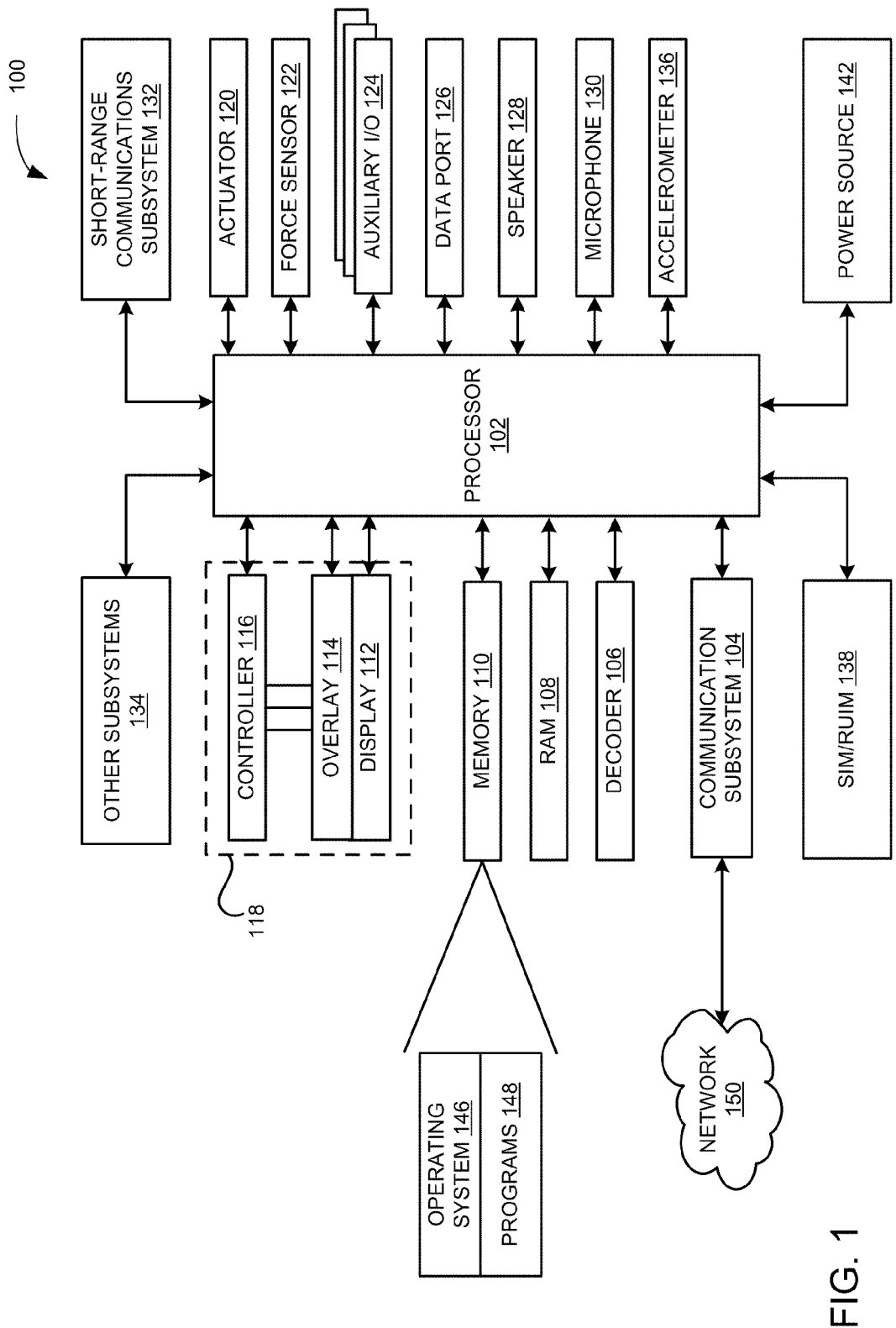
FIG. 1 is a simplified block diagram of components including internal components of a portable electronic device according to one aspect.

The present disclosure provides a method of synchronizing force data with touch data and a portable electronic device configured to perform the same. The synchronizing of force data with touch data may, in at least some embodiments, facilitate a low power mode for one or more force sensors and a touch-sensitive display. The low power mode for the sensors may be provided by way of a low reporting mode in which force data and touch data is reported to the processor 102 only when a change in state of the respective sensor occurs. The low reporting mode can be contrasted with a full reporting mode in which force sensors and a touch-sensitive display provide data at regular scanning cycles irrespective of the state of respective sensor.

In accordance with one embodiment, there is provided a method of synchronizing data acquisition in a portable electronic device, the method comprising: detecting touch events on a touch-sensitive display and storing touch data for each touch event with a time stamp for the touch event; detecting force events on the touch-sensitive display and storing force data for each force event with a time stamp for the force event; matching touch data for a particular touch event with force data for a force event corresponding to the particular touch event; and outputting the matched touch data and force data for input processing operations.

In accordance with another embodiment, there is provided a portable electronic device having a device housing in which a controller is received and which mechanically constrains a touch-sensitive display, and a force sensing transducer each connected to the controller, the controller being configured to perform any one of the methods described herein.

In accordance with a further embodiment, there is provided a portable electronic device, comprising: a housing; a controller received within the housing; a touch-sensitive display having a touch-sensitive overlay, the touch-sensitive display being mechanically constrained by the housing; and at least one force sensing transducer located below the touch-sensitive display on an opposite side to the touch-sensitive overlay, the at least one force sensing transducer being connected to the controller and measuring forces applied to the touch-sensitive display; wherein the controller is configured for: receiving notifications of touch events on a touch-sensitive display and storing touch data for each touch event with a time stamp for the touch event; receiving notifications of force events on the touch-sensitive display and storing force data for each force event with a time stamp for the force event; matching touch data for a particular touch event with force data for a force event corresponding to the particular touch event; and outputting the matched touch data and force data to input processing operations.

In some embodiments, the input processing operations comprise registering an input in accordance with the matched touch data and force data. In some embodiments, the input is a click input or an unclick input, or a selection or deselection input. In some embodiments, the device further comprises: a least one piezoelectric element connected to the controller, wherein the piezoelectric element is resiliently biased and located beneath a back side of the touch-sensitive display opposite to a touch-sensitive overlay of the touch-sensitive display, wherein the controller is configured for modulating a charge of the piezoelectric element thereby causing movement of the touch-sensitive display related to the housing and providing haptic feedback which simulates the collapse of a dome-type switch. In some embodiments, the force sensing transducer is a force sensing resistor.

In some embodiments, the device comprises: a plurality of force sensing transducers located beneath a back side of the touch-sensitive display opposite to the touch-sensitive overlay of the touch-sensitive display, the force sensing transducers measuring forces applied to the touch-sensitive overlay of the touch-sensitive display, wherein a sum of force data measured by the force sensing transducers is used to determine whether an applied force is greater than the predetermined force threshold; and a plurality of piezoelectric elements resiliently biased and located beneath the back side of the touch-sensitive display opposite to the touch-sensitive overlay of the touch-sensitive display, wherein the controller is configured for modulating a charge of the piezoelectric elements thereby causing movement of the touch-sensitive display related to the housing and providing haptic feedback which simulates the collapse of a dome-type switch. In some embodiments, the plurality of piezoelectric elements comprise four piezoelectric disks, each piezoelectric disk being located near a respective corner of the touch-sensitive display. In some embodiments, the force sensing transducers comprise four force sensing resistors, each force sensing resistor being located near a respective corner of the touch-sensitive display.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)) with a touch-sensitive overlay 114 operably connected to an electronic controller 116 that together comprise a touch-sensitive display 118, one or more actuators 120, one or more force sensors 122, one or more auxiliary input/output (I/O) subsystems 124, a data port 126, a speaker 128, a microphone 130, short-range communications subsystem 132, and other device subsystems 134. It will be appreciated that the controller 116 does not have to be physically integrated with the touch-sensitive overlay 114 and display screen 112. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

The portable electronic device 100 also includes one or more clocks including a system clock (not shown) and sleep clock (not shown). In other embodiments, a single clock can operate as both system clock and sleep clock. The sleep clock is a lower power, lower frequency clock. By way of example, the system clock may comprise a voltage controlled oscillator operating at a frequency of approximately 700 to 800 megahertz (though the speed of the system clock may vary depending on the mode of the portable electronic device 100), whereas the sleep clock may comprise a low power oscillator operating at a frequency in the range of 30 kilohertz to 60 kilohertz. In one example embodiment, the sleep clock operates at 32 kilohertz to reduce the power consumption.

The auxiliary I/O subsystems 124 could include other input devices such as one or more control keys, a keyboard or keypad, navigational tool (input device), or both. The navigational tool could be a clickable/depressible trackball or scroll wheel, or touchpad. The other input devices could be included in addition to, or instead of, the touch-sensitive display 118, depending on the embodiment.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
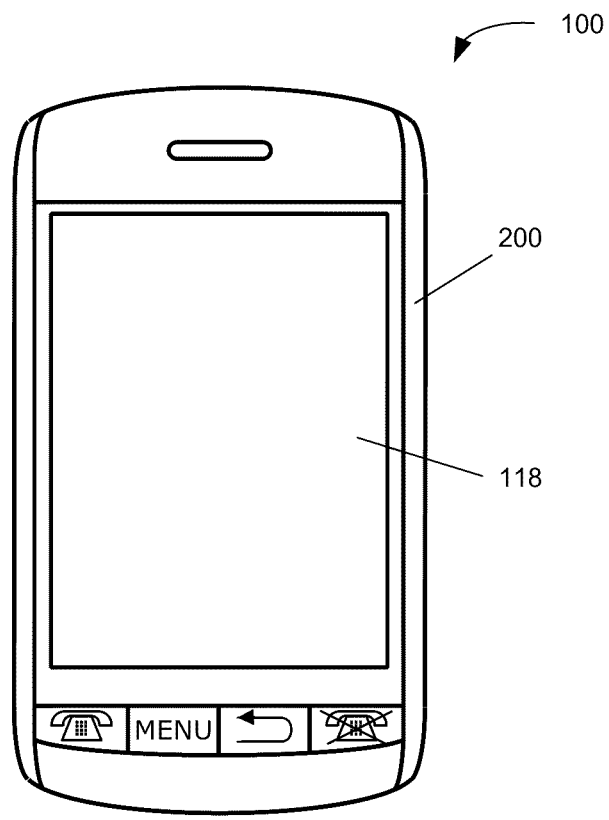
FIG. 2 is a front view of an example of a portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuators 120 comprise one or more piezoelectric devices that provide tactile feedback for the touch-sensitive display 118. The actuators 120 may be depressed by applying sufficient force to the touch-sensitive display 118 to overcome the actuation force of the actuators 120. The actuators 120 may be actuated by pressing anywhere on the touch-sensitive display 118. The actuator 120 may provide input to the processor 102 when actuated. Contraction of the piezoelectric actuators applies a spring-like force, for example, opposing a force externally applied to the touch-sensitive display 118. Each piezoelectric actuator includes a piezoelectric device, such as a piezoelectric (PZT) ceramic disk adhered to a metal substrate. The metal substrate bends when the PZT disk contracts due to build up of charge at the PZT disk or in response to a force, such as an external force applied to the touch-sensitive display 118. The charge may be adjusted by varying the applied voltage or current, thereby controlling the force applied by the piezoelectric disks. The charge on the piezoelectric actuator may be removed by a controlled discharge current that causes the PZT disk to expand, releasing the force thereby decreasing the force applied by the piezoelectric disks. The charge may advantageously be removed over a relatively short period of time to provide tactile feedback to the user. Absent an external force and absent a charge on the piezoelectric disk, the piezoelectric disk may be slightly bent due to a mechanical preload.

Figure 3A:
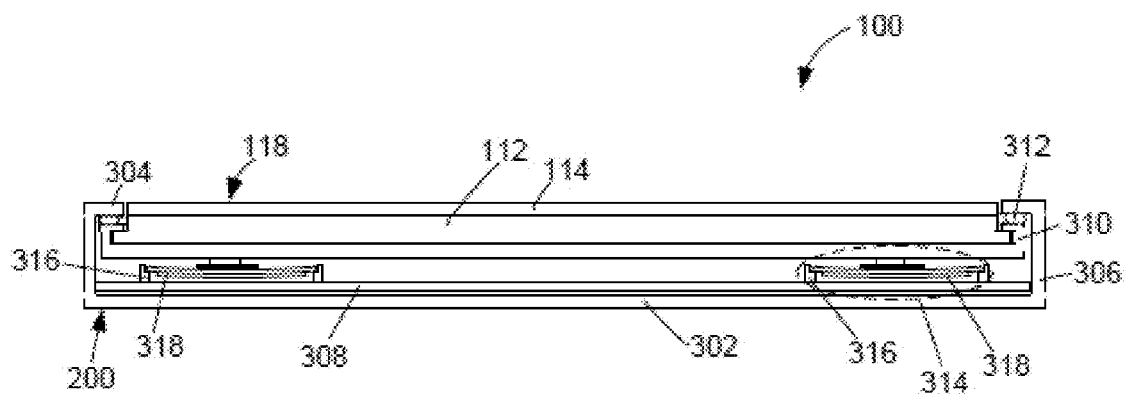
FIG. 3A is a sectional side view of portions of the portable electronic device of FIG. 2.
Figure 3B:
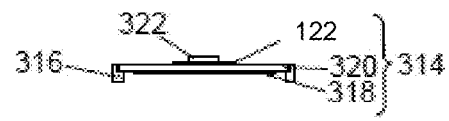
FIG. 3B is a side view of a portion of the portable electronic device shown in FIG. 3A.

The housing 200 can be any suitable housing for the internal components shown in FIG. 1. FIG. 3A shows a sectional side view of portions of the portable electronic device 100 and FIG. 3B shows a side view of a portion of the actuators 120. The housing 200 in the present example includes a back 302, a frame 304, which frames the touch-sensitive display 118 and sidewalls 306 that extend between and generally perpendicular to the back 302 and the frame 304. A base 308 is spaced from and is generally parallel to the back 302. The base 308 can be any suitable base and can include, for example, a printed circuit board or flexible circuit board supported by a stiff support between the base 308 and the back 302. The back 302 may include a plate (not shown) that is releasably attached for insertion and removal of, for example, the power source 142 and the SIM/RUIM card 138 referred to above. It will be appreciated that the back 302, the sidewalls 306 and the frame 304 may be injection molded, for example. In the example of the portable electronic device 100 shown in FIG. 2, the frame 304 is generally rectangular with rounded corners, although other shapes are possible.

The display screen 112 and the touch-sensitive overlay 114 are supported on a support tray 310 of suitable material such as magnesium for providing mechanical support to the display screen 112 and touch-sensitive overlay 114. A compliant spacer such as a gasket compliant 312 is located around the perimeter of the frame 304, between an upper portion of the support tray 310 and the frame 304 to provide a gasket for protecting the components housed in the housing 200 of the portable electronic device 100. A suitable material for the compliant gasket 312 includes, for example, a cellular urethane foam for providing shock absorption, vibration damping and a suitable fatigue life. In some embodiments, a number of compliant spacers may be used to provide the function of the gasket compliant 312.

Figure 4:
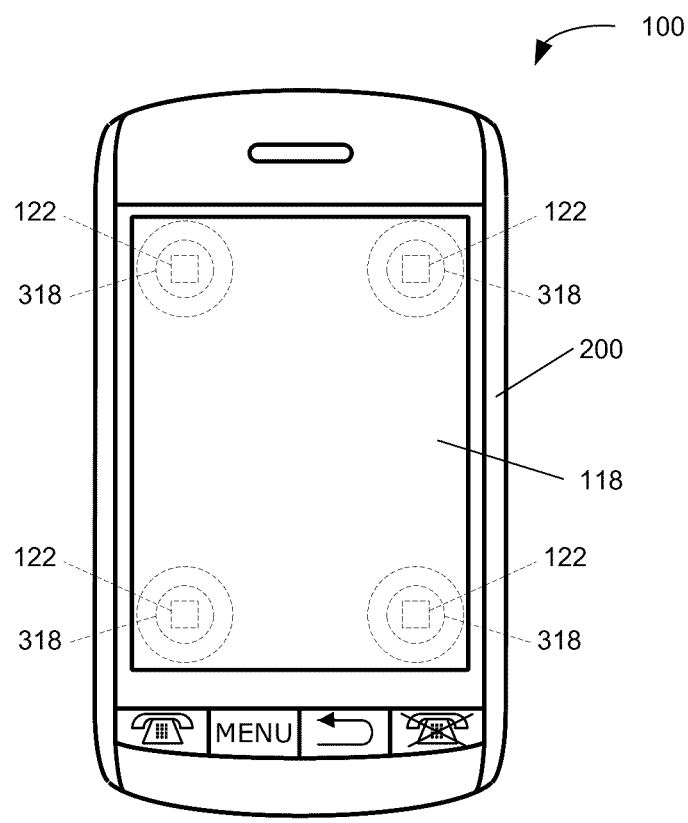
FIG. 4 is a front view of an example of a portable electronic device in a portrait orientation, showing hidden detail in ghost outline.

The actuators 120 includes four piezoelectric disk actuators 314, as shown in FIG. 4, with each piezoelectric disk actuator 314 located near a respective corner of the touch-sensitive display 118. Referring again to FIGS. 3A and 3B, each piezoelectric disk actuator 314 is supported on a respective support ring 316 that extends from the base 308 toward the touch-sensitive display 118 for supporting the respective piezoelectric disk actuator 314 while permitting flexing of the piezoelectric disk actuator 314. Each piezoelectric disk actuator 314 includes a piezoelectric disk 318 such as a PZT ceramic disk adhered to a metal substrate 320 of larger diameter than the piezoelectric disk 318 for bending when the piezoelectric disk 318 contracts as a result of build up of charge at the piezoelectric disk 318. Each piezoelectric disk actuator 314 is supported on the respective support ring 316 on one side of the base 308, near respective corners of the metal substrate 320, base 308 and housing 200. The support 316 ring is sized such that the edge of the metal substrate 320 contacts the support ring 316 for supporting the piezoelectric disk actuator 314 and permitting flexing of the piezoelectric disk actuator 314.

A shock-absorbing element 322, which in the present example is in the form of a cylindrical shock-absorber of suitable material such as a hard rubber is located between the piezoelectric disk actuator 314 and the support tray 310. A respective force sensor 122 is located between each shock-absorbing element 322 and the respective piezoelectric disk actuator 314. A suitable force sensor 122 includes, for example, a puck-shaped force sensing resistor for measuring applied force (or pressure). It will be appreciated that a force can be determined using a force sensing resistor as an increase in pressure on the force sensing resistor results in a decrease in resistance (or increase in conductance). In the portable electronic device 100, each piezoelectric disk actuator 314 is located between the base 308 and the support tray 310 and force is applied on each piezoelectric disk actuator 314 by the touch-sensitive display 118, in the direction of the base 308, causing bending of the piezoelectric disk actuator 314. Thus, absent an external force applied by the user, for example by pressing on the touch-sensitive display 118, and absent a charge on the piezoelectric disk actuator 314, the piezoelectric disk actuator 314 undergoes slight bending. An external applied force in the form of a user pressing on the touch-sensitive display 118 during a touch event, and prior to actuation of the piezoelectric disk actuator 314, causes increased bending of the piezoelectric disk actuator 314 and the piezoelectric disk actuator 314 applies a spring force against the touch-sensitive display 118. When the piezoelectric disk 318 is charged, the piezoelectric disk 318 shrinks and causes the metal substrate 320 and piezoelectric disk 318 to apply a further force, opposing the external applied force, on the touch-sensitive display 118 as the piezoelectric actuator 314 straightens.

Each of the piezoelectric disk actuators 314, shock absorbing elements 322 and force sensors 122 are supported on a respective one of the support rings 316 on one side of the base 308. The support rings 316 can be part of the base 308 or can be supported on the base 308. The base 308 can be a printed circuit board while the opposing side of the base 308 provides mechanical support and electrical connection for other components (not shown) of the portable electronic device 100. Each piezoelectric disk actuator 314 is located between the base 308 and the support tray 310 such that an external applied force on the touch-sensitive display 118 resulting from a user pressing the touch-sensitive display 118 can be measured by the force sensors 122 and such that the charging of the piezoelectric disk actuator 314 causes a force on the touch-sensitive display 118, away from the base 308.

In the present embodiment each piezoelectric disk actuator 314 is in contact with the support tray 310. Thus, depression of the touch-sensitive display 118 by user application of a force thereto is determined by a change in resistance at the force sensors 122 and causes further bending of the piezoelectric disk actuators 314 as shown in FIG. 3A. Further, the charge on the piezoelectric disk actuator 314 can be modulated to control the force applied by the piezoelectric disk actuator 314 on the support tray 310 and the resulting movement of the touch-sensitive display 118. The charge can be modulated by modulating the applied voltage or current. For example, a current can be applied to increase the charge on the piezoelectric disk actuator 314 to cause the piezoelectric disk 318 to contract and to thereby cause the metal substrate 320 and the piezoelectric disk 318 to straighten as referred to above. This charge therefore results in the force on the touch-sensitive display 118 for opposing the external applied force and movement of the touch-sensitive display 118 away from the base 308. The charge on the piezoelectric disk actuator 314 can also be removed via a controlled discharge current causing the piezoelectric disk 318 to expand again, releasing the force caused by the electric charge and thereby decreasing the force on the touch-sensitive display 118, permitting the touch-sensitive display 118 to return to a rest position.

Figure 5:
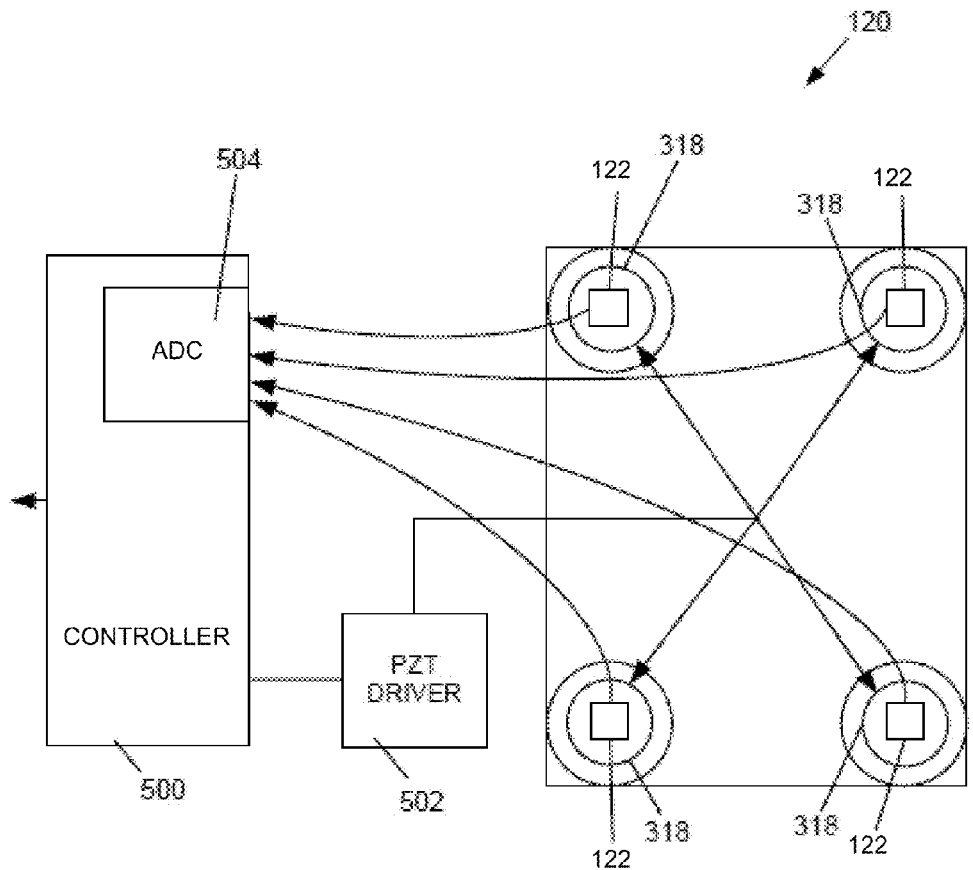
FIG. 5 is a block diagram of a circuit for controlling the actuators of the portable electronic device in accordance with one example embodiment of the present disclosure.

FIG. 5 shows the circuitry for controlling the actuators 120 of the portable electronic device 100 according to one embodiment. As shown, each of the piezoelectric disks 318 is connected to a controller 500 such as a microprocessor including a piezoelectric driver 502 and an amplifier and analog-to-digital converter (ADC) 504 that is connected to each of the force sensors 122 and to each of the piezoelectric disks 318. The controller 500 is also in communication with the main processor 102 of the portable electronic device 100. The controller 500 can provide signals to the main processor 102 of the portable electronic device 100. It will be appreciated that the piezoelectric driver 502 may be embodied in drive circuitry between the controller 500 and the piezoelectric disks 318.

The mechanical work performed by the piezoelectric disk actuator 314 can be controlled to provide generally consistent force and movement of the touch-sensitive display 118 in response to detection of an applied force on the touch-sensitive display 118 in the form of a touch, for example. Fluctuations in mechanical work performed as a result of, for example, temperature, can be reduced by modulating the current to control the charge.

The controller 500 controls the piezoelectric driver 502 for controlling the current to the piezoelectric disks 318, thereby controlling the charge. The charge is increased to increase the force on the touch-sensitive display 118 away from the base 308 and decreased to decrease the force on the touch-sensitive display 118, facilitating movement of the touch-sensitive display 118 toward the base 308. In the present example, each of the piezoelectric disk actuators 314 are connected to the controller 500 through the piezoelectric driver 502 and are all controlled equally and concurrently. Alternatively, the piezoelectric disk actuators 314 can be controlled separately.

The portable electronic device 100 is controlled generally by monitoring the touch-sensitive display 118 for a touch event thereon, and modulating a force on the touch-sensitive display 118 for causing a first movement of the touch-sensitive display 118 relative to the base 308 of the portable electronic device 100 in response to detection of a touch event. The force is applied by at least one of the piezoelectric disk actuators 314, in a single direction on the touch-sensitive input surface of the touch-sensitive display 118. In response to determination of a touch event, the charge at each of the piezoelectric disks 318 is modulated to modulate the force applied by the piezoelectric disk actuators 314 on the touch-sensitive display 118 and to thereby cause movement of the touch-sensitive display 118 for simulating the collapse of a dome-type switch. When the end of the touch event is detected, the charge at each of the piezoelectric disks 318 is modulated to modulate the force applied by the piezoelectric disk actuators 314 to the touch-sensitive display 118 to cause movement of the touch-sensitive display 118 for simulating release of a dome-type switch.

The touch-sensitive display 118 is moveable within the housing 200 as the touch-sensitive display 118 can be moved away from the base 308, thereby compressing the compliant gasket 312, for example. Further, the touch-sensitive display 118 can be moved toward the base 308, thereby applying a force to the piezoelectric disk actuators 314. By this arrangement, the touch-sensitive display 118 is mechanically constrained by the housing 200 and resiliently biased by the compliant gasket compliant 312. In at least some embodiments, the touch-sensitive display 118 is resiliently biased and moveable between at least a first position and a second position in response to externally applied forces wherein the touch-sensitive display 118 applies a greater force to the force sensors 122 in the second position than in the first position. The movement of the touch-sensitive display 118 in response to externally applied forces is detected by the force sensors 122.

The analog-to-digital converter 504 is connected to the piezoelectric disks 318. In addition to controlling the charge at the piezoelectric disks 318, an output, such as a voltage output, from a charge created at each piezoelectric disk 318 may be measured based on signals received at the analog to digital converter 504. Thus, when a pressure is applied to any one of the piezoelectric disks 318 causing mechanical deformation, a charge is created. A voltage signal, which is proportional to the charge, is measured to determine the extent of the mechanical deformation. Thus, the piezoelectric disks 318 also act as sensors for determining mechanical deformation.

Figure 6:
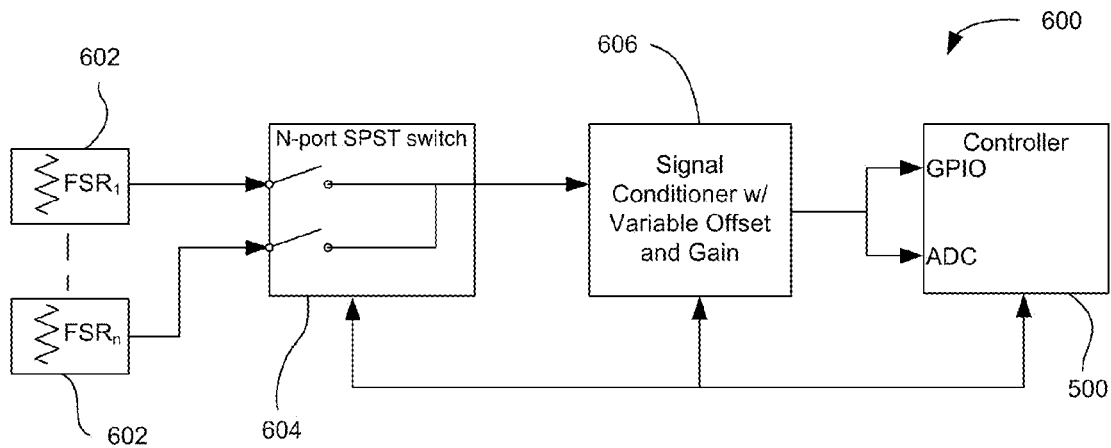
FIG. 6 is a block diagram of a circuit for controlling the force sensors of the portable electronic device in accordance with one example embodiment of the present disclosure.

FIG. 6 shows a block diagram of a circuit 600 for controlling the force sensors 122 of the portable electronic device 100 according to one embodiment of the present disclosure. As described above, the force sensors 122 measure the amount of applied force to the touch-sensitive display 118 (e.g., by the device user's fingers) and the touch-sensitive display 118 measures the location of touch events. The portable electronic device 100 described above provides a virtual click or "v-click" touchscreen which uses touch data and force data to generate a click or unclick inputs and provide tactile feedback in response to a click or unclick inputs using the piezoelectric disks 318 to actuate the touch-sensitive display 118. The touch-sensitive display 118 is actuated (or moved) up and down in response to the expansion and contraction of the piezoelectric disks 318 as described above.

The circuit 600 consists of both analog and digital sections and provides a means of configuring a programmable response of the force sensors 122 to a user's press against the touch-sensitive display 118. In the shown embodiment, the force sensors 122 comprise a number of force sensing resistors (FSRs) 602 for measuring applied force (or pressure). The resistance of the FSRs 602 change when a force or pressure is applied to them. The change in resistance causes a detectable voltage change. The FSRs 602 are numbered 1 to n where n is the total number of resistors. As described above in connection with FIG. 3A to 5, in some embodiments four FSRs 602 are used and located with a piezoelectric disk actuator 314 near a respective corner of the touch-sensitive display 118. The FSRs 602 may be disk-shaped or puck-shaped and may be located on top of the piezoelectric disks 318 and below the touch-sensitive display 118.

The FSRs 602 are each controlled by a digitally controlled switch. In the shown embodiment, the FSRs 602 are connected to an n-port switch 604 (also known as a multi-port switch) which comprises n single-pole, single-throw (SPST) switches. In embodiments in which four FSRs 602 are used, the n-port switch 604 comprises four SPST switches, one for each FSR 602. The n-port switch 604 controls which, if any, of the FSRs 602 report force data to host processor 102 (directly or indirectly). The n-port switch 604 and SPST switches are controlled by the controller 500 of FIG. 5.

The n-port switch 604 generates an output signal which is sent to a signal conditioning circuit or module 606 of the circuit 600. The signal conditioning module 606 can be used to offset (or bias) the FSRs 602 at various levels under the control of the controller 500. The signal conditioning module 606 can also be used to vary the sensitivity of the FSR response by varying the gain provided by the signal conditioning module 606. The controller 500 controls the variable offset and gain of the signal conditioning module 606. In at least some embodiments, the signal conditioning module 606 comprises digital potentiometers which are controlled by the controller 500 and utilized for adjusting and calibrating the response of the FSRs 602 and an operational amplifier (Op-Amp). In other embodiments, the signal conditioning module 606 could be omitted depending on the configuration of the FSRs 602 or other force sensor 122 used in the circuit 600.

Typically, the FSRs 602 are pre-loaded with an amount of force as a result of the mechanical forces applied by the housing 200 and touch-sensitive display 118. The amount of pre-loading may vary between embodiments. The bias and gain of the FSRs 602 can be calibrated to account for the pre-loading and FSR sensitivity differences using the signal conditioning module 606, for example, using digital potentiometers. In the shown embodiment, the circuit 600 can be used to calibrate each FSR 602 individually by closing the respective switch in the n-port switch 604.

In other embodiments, rather than summing all of the FSRs 602 via the n-port switch 604 groups of FSRs 602 may be summed and evaluated independently. For example, when four FSRs 602 are used near the respective corners of the touch-sensitive display 108, the top pair of FSRs 602 and bottom pair of FSRs 602 could be summed and evaluated independently (e.g., groups of two FSRs 602 could be evaluated). These groupings could shift depending on whether the portable electronic device is in a portrait or landscape orientation. Alternatively, the left side and right sight FSRs 602 could be summed and evaluated independently. In yet other embodiments, individual FSRs 602 could be read/scanned and evaluated independently. A force event could be triggered if all, any group or pair, or any one of the FSRs 602 measured a force which exceeds the predetermined force/pressure threshold. In other embodiments, other force sensing transducers comprising a force sensor such as a strain gauge or pressure sensor could be used to detect a force event (e.g. an applied force against the touch-sensitive display which exceeds the predetermined wake force/pressure threshold) instead of FSRs 602.

The controller 500, in the shown embodiment of FIG. 6, includes a General Purpose Input/Output (GPIO). A GPIO is an interface which can act as input to read digital signals from other parts of the circuit 600 such as the signal conditioning module 606, or output digital signals to other parts of the circuit. The GPIO may be provided by a GPIO port having a number of individual GPIOs configurable as either input or outputs, and may be configurable to produce interrupts to the host processor 102. The controller 500 also includes an ADC 504 (FIG. 5) with a corresponding interface as described above. Alternatively, the controller 500 or signal conditioning block 606 could incorporate an analog comparator with a programmable reference for achieving the same.

The controller 500 uses a clock to schedule "on" and "off" time of the circuit 600 accordance with a predetermined duty cycle. The duty cycle is programmable and controls the balance between power consumption and response latency. In some embodiments, the n-port switch 604 is closed and the FSRs 602 are powered "on" for approximately 2.5 milliseconds every 12 milliseconds. During this time, the controller 500 reads the FSRs 602 to detect force events, that is, to determine if a force greater than a predetermined amount of applied force (i.e., a force threshold) is read by one or more of the FSRs 602. The FSRs 602 are powered-off for the remainder of the duty cycle.

The duration of the duty cycle may be selected to configure the duration of a force applied to the touch-sensitive display 118 (e.g., screen press) required to trigger a force event. For example, in some embodiments the duration of time which the FSRs 602 are read is configured to detect a "push and hold" or "press and hold" action caused by the device user pressing a finger against the touch-sensitive display 118 and holding it against the touch-sensitive display 118 for a predetermined duration such as, for example, approximately 100 milliseconds. The predetermined duration for a press and hold may be programmable/configurable, for example, to tune the wakeup function to the device user's habits or preferences and to filter out small ambient vibrations from normal movements, such as the device user walking with the device 100. For example, an inertial event caused by a tap event would occur and be over within a few milliseconds, e.g. approximately 20-25 milliseconds or less. The predetermined duration for a press and hold action is set to be longer than that of a typical tap event such as, for example, approximately 100 milliseconds. However, the predetermined duration could be more or less than 100 milliseconds and would typically be less than one second, and possibly less than 500 milliseconds. This means that any inertial event would have ended when the predetermined duration for detecting a press and hold event is reached. The touch-sensitive display 118 should also detect a tap event of the predetermined duration at the same time. Due to latency issues the forces measured by the force sensors 122 and the touches measures by the touch-sensitive display 118 may not be reported at the same time, however, these events can be synchronized or matched with each other.

In the shown embodiment, the controller 500 configures the n-port switch 604 to sum the measurement of all of the FSRs 602 by closing each of the 4 SPST switches of the n-port switch 604 which are normally open, thereby connecting the FSRs 602 in parallel. The resultant output signal of the n-port switch 604 is then feed as input into the signal conditioning module 606. The variable offset and gain provided by the signal conditioning module 606 allows for a programmable response from the FSRs 602, thereby controlling the predetermined amount of applied force (i.e., force threshold) which is needed to trigger a force event.

As a result of summing of the readings of the FSRs 602 and a properly set force threshold, it is possible to trigger a force event when a device user presses on the touch-sensitive display 118 at any location. This occurs because a screen press under these conditions causes a force greater than or equal to the predetermined amount of applied force (i.e., the force threshold) to be detected on at least one of the FSRs 602. The force event will typically be detected by the FSR 602 closest to the location of the applied force on the touch-sensitive display 118 and possibly one or more of the other FSRs 602.

Force events are defined by applied forces greater than the force threshold. Force events can be detected using either analog or digital threshold comparator depending on the embodiment. In some embodiments, the analog signal output by the signal conditioning module 606 can be digitized by an ADC and then evaluated with a digital threshold comparator which can be implemented either in hardware or in software. For example, in some embodiments, force events could be detected by the controller's internal ADC 504 detecting that the analog signal has exceeded the force threshold. In other embodiments, force events could be detected by an analog comparator circuit (not shown) which triggers an interrupt to the controller 500 when the analog signal output by the signal conditioning module 606 exceeds the force threshold. The analog comparator can detect and signal a high/low output to the processor 102. When a force event is detected, the controller 500 sends a signal to the host processor 102 of the device 100 that an interrupt event was detected, and brings the portable electronic device 100 out of the sleep mode and into the full power mode.

The described method of triggering a force event uses a relatively small amount of power while still allowing force events to be detected. This functionality also reproduces the response of a portable electronic device 100 caused by the collapse of a dome-type switch disposed between the touch-sensitive display 118 and housing 200 when the device user presses any where on the touch-sensitive display 118.

As will be appreciated by persons skilled in the art, sampling of forces and touches applied to the touch-sensitive display 118 during data acquisition consumes scarce device power. During normal operation, this sampling occurs at a high rate to keep up with user interactions with the touch-sensitive display 118. However, when the portable electronic device 100 is idle a high sampling rate, it needlessly consumes power resulting in a shorter life for the power source 142. The present disclosure provides a method and portable electronic device 100 which aims to minimize, or at least reduce, the power consumed by the portable electronic device 100 while still generating click and unclick inputs and providing haptic feedback in response to screen presses.

To reduce the power and processing resources consumed, the force sensors 122 and touch-sensitive display 118 are operating in a low reporting mode in which data is provided to the processor 102 only when a change in state of the respective sensor occurs. The low reporting mode can be contrasted with a full reporting mode in which the force sensors 122 and touch-sensitive display 118 provide data at regular scanning cycles irrespective of the state of respective sensor.

For the touch-sensitive display 118, a change in the location of a touch event greater than a predetermined threshold or a change in number of touches by the user's finger (or stylus, etc.) applied to the touch-sensitive display 118 will trigger a change of state.

For the force sensors 122, a change in state occurs when a force greater than a predetermined force threshold is detected by the force sensor controller 500 on all, any group or pair, or any one of the force sensors 122, depending on the embodiment. A force greater than the predetermined force threshold is assumed to be the force exerted by a user's finger (or stylus, etc.) to the touch-sensitive display 118.

The present disclosure provides a method of synchronizing force data with touch data and a portable electronic device configured to perform the same. Synchronization between the force sensors 122 and touch-sensitive display 118 allows the v-click functionality described above to associate the correct force data with the correct touch data. Without synchronization, invalid inputs, improper feedback responses or both may be generated by the portable electronic device 100. For example, if a first finger is on the touch-sensitive display 118 and a second finger quickly contacts the touch-sensitive display 118 with a sufficient force to trigger a force event associated with a "click" or select input, then processor 102 may determine that the force event is due the first finger if the sensors are not synchronized. The processor 102 would then register a "click" or selection input at the location of the first touch rather than the location of the second touch and result in the wrong input being generated. For example, if a virtual keyboard were active during this scenario, a wrong letter would be selected.

The synchronization of force data with touch data may also minimize or at least reduce the latency between the reception of touch data and force data and the generation of the click/unclick input response time while still providing a tactile feedback provided by the expansion and contraction of the piezoelectric disks 318. As noted above, the expansion and contraction of the piezoelectric disks 318 simulates the collapse of a dome-type switch thereby providing tactile feedback akin to a "sticky" or hard key press.

Figure 7:
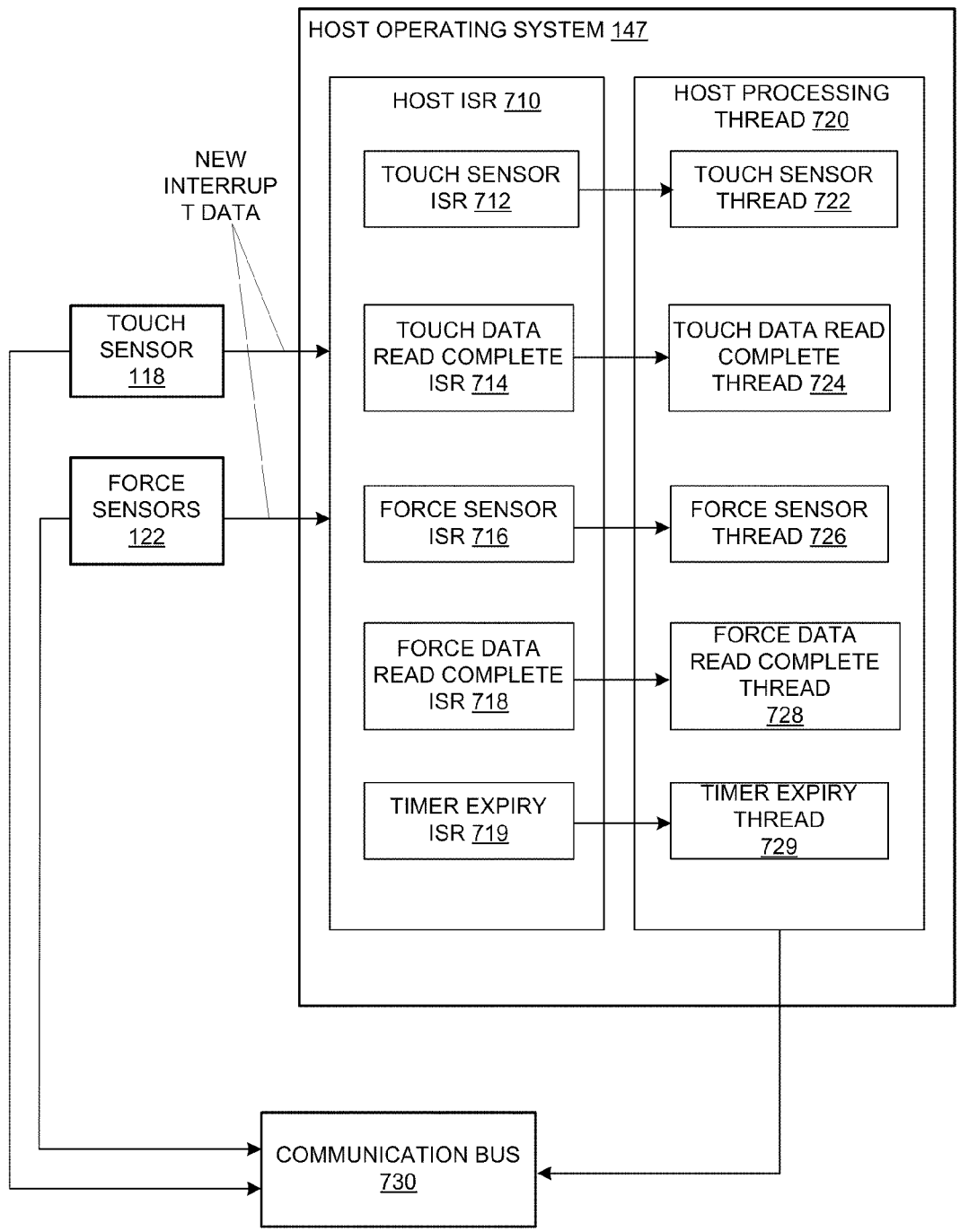
FIG. 7 is a block diagram illustrating software modules for synchronizing force data with touch data in accordance with one example embodiment of the present disclosure.

In at least some embodiments, interrupt handlers are used to process touch data and force data generated by the touch-sensitive display 118 and force sensors 122 to increase response time compared with higher level software implementations by the operating system 146 or applications 148. Interrupt handlers are callback subroutines of the operating system 146. As understood to persons of skill in the art, interrupt handlers are low-level counterparts of event handlers which are initiated by either hardware interrupts or software interrupts. FIG. 7 illustrates interrupt handlers for the touch-sensitive display 118 and force sensors in accordance with one example embodiment of the present disclosure. The interrupt handlers are divided into two types: interrupt service routines (ISRs) 710 and interrupt processing threads 720. The ISRs 710 may also be referred to as first-level interrupt handlers, hard interrupt handlers, fast interrupt handlers and top-half of the interrupt. The interrupt processing threads 720 may also be referred to as second-Level Interrupt Handlers, slow/soft interrupt handlers and bottom-half of interrupt.

In the embodiment of FIG. 7, the ISRs 710 comprise: a touchscreen ISR 712, a touchscreen read complete ISR 714, force sensor ISR 716, force sensor read complete ISR 718 and a timer expiry ISR 719, and the processing threads 620 comprise: a touchscreen processing thread 722, touchscreen read complete processing thread 724, force sensor processing thread 726, force sensor read complete processing thread 728 and a timer expiry processing thread 729. The names of the ISRs 710 and processing threads 720 are for convenience and are not intended to be limiting.

Typically ISRs 710 have a higher processing priority in the processing queue of processor 102 than the interrupt processing threads 720 and so may be completed sooner have a more accurate time than the interrupt processing threads 720. For example, other ISRs 710 or interrupt processing threads 720 can delay the execution of interrupt processing threads 720. Thus, the use of ISRs 710 in the described embodiment may be advantageous in that the ISRs 710 reduce the latency which would occur if equivalent functions were performed using interrupt processing threads 720. Advantages in reduced latency may be particularly seen when processing timing parameters such as the time stamps described in the present disclosure. However, the division of functions between ISRs 710 and interrupt processing threads 720 described herein relates to one example embodiment and that the functions could be separately differently in other embodiments. Furthermore, some of the functions performed by the software event handlers could be performed in hardware resulting at least a reduced number of software event handlers being required.

When the touch-sensitive display 118 detects a change in its state, its controller 116 sends an interrupt to the operating system 146 via the touchscreen ISR 712. In some embodiments, a change in state occurs when the touch-sensitive display 118 detects a touch event greater than a predetermined threshold on the touch-sensitive display 118. The predetermined threshold could be a predetermined change in the size of the touch event reported by the touch-sensitive display 118 or a predetermined change in the location of a centroid of the touch event reported by the touch-sensitive display 118. The predetermined change in the size or location may be measured in pixels and could be 10 pixels in size, 5 pixels in size, or 2 pixels in size in some examples embodiments. It will be appreciated that pixels which are included in the touch event reported by the touch-sensitive display 118 are pixels which register a change in state which exceeds a predetermined threshold, for a capacitance touchscreen the change in state is a change in the capacitance which exceeds a predetermined capacitance threshold. The predetermined threshold may be configurable or programmable.

When the interrupt is received by the touchscreen ISR 712, it generates a time stamp (denoted "$TS_{TS}$") for the touch event with a value equal to the current time as indicated by the clock used by the processor 102. This could be the system clock or sleep clock, depending on whether the device 100 is in a full power mode or sleep mode. The touchscreen ISR 712 also triggers the timer expiry ISR 719 via a software interrupt.

The timer expiry ISR 719 starts a countdown timer with a duration equal to the duration of the scan cycle of touch-sensitive display 118 (denoted "$t_{sc}$") plus a predetermined margin (denoted "Z") to account for latency delays or errors. The processor 102 restarts the countdown timer if it is already running. In some embodiments, the predetermined margin of error is 0.1 milliseconds (ms). The timer expiry ISR 719 also sets a countdown counter to a predetermined value (X). The countdown counter is the number of times that the countdown timer is allowed to expire. In at least some embodiments the value of the countdown counter is five (i.e. x=5) although this value may vary between embodiments.

When the forces sensors 122 detect a force event or other notifiable change in state, the force sensor controller 500 sends an interrupt to the operating system 146 via the force sensor ISR 716. In some embodiments, a change in state occurs when the force sensors 122 detect a force event comprising a force on greater than a predetermined force threshold applied to the touch-sensitive display 118. The predetermined force threshold could be 50 grams in some embodiments which, depending on the force sensor 122 and the calibration of the control circuit 600, may correspond to two ADC counts. The predetermined force threshold may be configurable or programmable using the signal conditioning module 606 described above.

When the interrupt is received by the force sensor ISR 716, it generates a time stamp ($TS_{FS}$) for the force event with a value equal to the current time as indicated by the clock used by the processor 102. The force sensor ISR 716 also triggers the timer expiry ISR 719 via a software interrupt using the same parameters described above in connection with the touchscreen ISR 712. Thus, either a new force event reported by the force sensors 122 and or a new touch event reported by touch-sensitive display 118 can start or restart the countdown timer with the same parameters.

The touchscreen ISR 712 also triggers the touchscreen processing thread 722 via a software interrupt. The touchscreen ISR 712 provides the time stamp of the touch-sensitive display 118 ($TS_{TS}$) as input to the touchscreen processing thread 722 which stores the time stamp ($TS_{TS}$) and starts to read touch data from the touch-sensitive display 118 via the communication bus 730. The communications bus 730 connects the touch-sensitive display 118 and force sensors 122 to the processor 102 and is typically part of a main printed circuit board or flexible circuit board of the portable electronic device 100. The touch data is read until the countdown timer stops (i.e., when the timer has expired and countdown counter is equal to 0).

The touchscreen read complete processing thread 724 is triggered by the communication bus 730 when it completes reading the touch-sensitive display 118, i.e. when then countdown timer stops. The communication bus 730 provides the touch data to the processor 102 which stores the touch data in its internal memory with the time stamp ($TS_{TS}$) stored by the touchscreen processing thread 716. The processor 102 then calls a click/unclick input process (not shown) with input variables comprising the new touch data which was just stored, and the force data corresponding to the value of the time stamp of the touch-sensitive display 118 ($TS_{TS}$).

In at least some embodiments, the touch-sensitive display 118 is slower than the force sensors 122 and has a longer scan cycle. Accordingly, the force data is taken at a time prior to the touch data as measured by the time stamp of the touch-sensitive display 118 ($TS_{TS}$) because the force data and touch data reported the force sensors 122 and touch-sensitive display 118 are out of time (i.e., out of synchronization). Accordingly, the force data used in the click/unclick input process is taken from a time equal to time stamp of the touch data ($TS_{TS}$) minus a time correction factor (Y). The time correction factor is used to select force data at a predetermined time before the time stamp of the touch-sensitive display 118 ($TS_{TS}$). The time of the force data selected for the click/unclick input process can be expressed by the equation time=$TS_{TS}$−Y. In at least some embodiments, the time correction factor is equal to twice the touch-sensitive display scan cycle or Y=$2*t_{sc}$. However, the value of Y may vary between embodiments depending, for example, on the touch-sensitive display 118 and force sensors 122 used and the duration of the respective scan cycles.

It is possible that the touch-sensitive display 118 could be faster than the force sensors 122 and have a shorter scan cycle than the force sensors 122 in some embodiments, depending on the touch-sensitive display 118 and force sensors 122 used and the respective scan cycles (also known as the sampling rate). In such embodiments, the time correction factor is used to select force data at a predetermined time after the time stamp of the touch-sensitive display 118 ($TS_{TS}$).

The force sensor ISR 716 triggers the force sensor processing thread 726 via a software interrupt. The force sensor ISR 716 provides the force sensor time stamp ($TS_{FS}$) as input to the force sensor processing thread 726 which stores the time stamp ($TS_{FS}$) and starts to read force data from the force sensors 122 via the communication bus 730. The force data is read until the countdown timer stops (i.e., when the timer has expired and countdown counter is equal to 0).

The force sensor read complete processing thread 728 is triggered by the communication bus 730 when it completes reading the force sensors 122, i.e. when then countdown timer stops. The communication bus 730 provides the force data to the processor 102 which stores the force data in its internal memory with the force data time stamp ($TS_{FS}$) stored by the force sensor processing thread 726. As noted above, the touch data and force data reported by the touch-sensitive display 118 and force sensors 122 are out of time. As a result, touch data and force data received at the same time by the host processor 102 do not match and relate to either different touch events or possibly the same touch event but at different times during that event.

Unlike touchscreen read complete processing thread 724, the processor 102 does not call the click/unclick input process when executing the force sensor read complete processing thread 728. This is because the touch-sensitive display 118 drives the click/unclick input process. If there is no matching touch event, there is no click/unclick input regardless of whether a force event has occurred.

The expiry of the countdown timer triggers the timer expiry processing thread 729 via a software interrupt. When the value of the countdown counter (X) is greater than zero (0) (i.e., X>0), the countdown counter is decremented by 1 (i.e., X=X−1) and the countdown timer is restarted with a duration equal to the time of last timer expiry+1 touch screen scan cycle ($t_{sc}$). Next, click/unclick input process is called with the input variables of the most recent touch data, i.e., the touch data having the most recent time stamp ($TS_{TS}$), and the force data corresponding to the value of the time of last timer expiry−time correction factor (Y). This process repeats until the countdown counter is zero.

Figure 8:
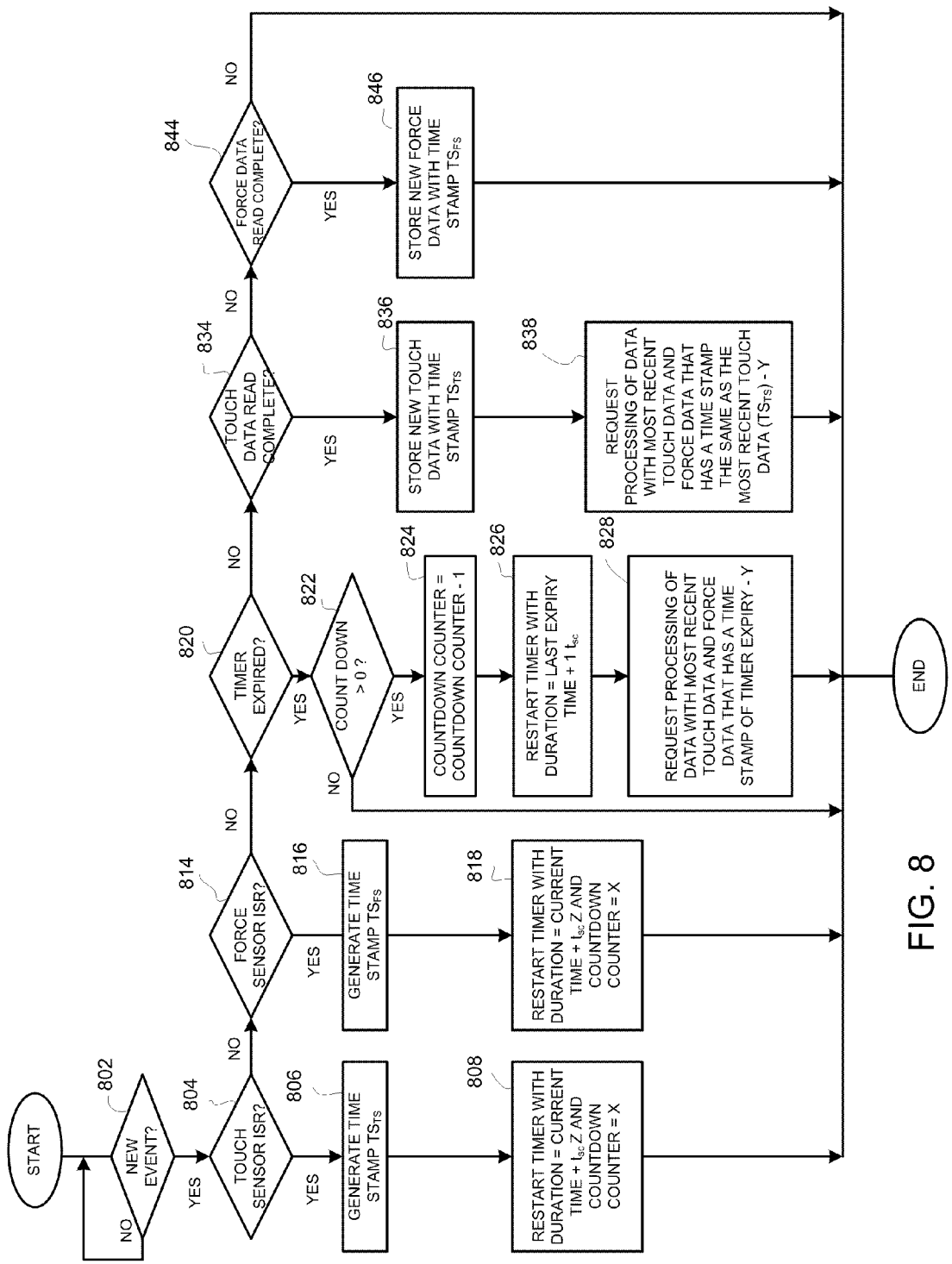
FIG. 8 is a flowchart illustrating a method of synchronizing force data with touch data in accordance with one example embodiment of the present disclosure.

Referring now to FIG. 8, a method 800 of new event handling used in synchronizing force data with touch data in accordance with one example embodiment of the present disclosure will be described. The steps of FIG. 8 may be carried out by routines or subroutines of software executed by, for example, the processor 102. For example, the synchronizing may be performed by the operating system 146. The coding of software for carrying out such steps is well within the scope of a person of ordinary skill in the art given the present disclosure. In the shown method, the processor 102 of the host portable electronic device 100 is the master, receives the data from the force sensors 122 and touch-sensitive display 118, and uses its clock/time to synchronize force data and touch data.

First, when a new event occurs (step 802), the processor 102 determines the type of new event based on the triggering hardware or software interrupt.

When the new event is a touchscreen ISR 712 (step 804), the touchscreen processing thread 722 is executed. The touchscreen processing thread 722 is triggered when a change in state of the touch-sensitive display 118 occurs. As described above, a change in state of the touch-sensitive display 118 occurs when a change in the size of one or more touch events, the number of touch events, or the location of touch event(s) change by more than the predetermined threshold. In the touchscreen processing thread 722, a time stamp ($TS_{TS}$) for the touch event is generated (step 806) and the countdown timer is restarted with an expiry time of the current time plus the duration of the scan cycle of touch-sensitive display 118 (denoted "$t_{sc}$") and the predetermined margin (Z) and the countdown counter is reset to X (step 808).

When the new event is a force sensor ISR 716 (step 814), the force sensor processing thread 726 is executed. The force sensor processing thread 726 is triggered when a change in state of the force sensor 122 occurs. As described above, a change in state of the force sensor 122 occurs when there is a change in the force applied to the touch-sensitive display 118 which exceeds the predetermined force threshold. In the force sensor processing thread 726, the time stamp ($TS_{FS}$) for the force event is generated (step 816) and the countdown timer is restarted with an expiry time of the current time plus the duration of the scan cycle of touch-sensitive display 118 (denoted "$t_{sc}$") and the predetermined margin (Z) and the countdown counter is reset to X (step 818).

When the new event is the expiry of the countdown timer (step 820), the timer expiry processing thread 729 is executed. The timer expiry processing thread 729 is triggered when the countdown timer initiated by the touchscreen ISR 712 or force sensor ISR 716 expires. The expiry of the timer triggers the timer expiry ISR 719 which in turn triggers the timer expiry processing thread 729.

In the timer expiry processing thread 729, when the countdown counter is greater than zero (step 822), the countdown timer is decremented by one (step 824), the timer is restarted with an expiry time equal to the time at which the countdown timer last expired plus the duration of one scan cycle of the touch-sensitive display 118 ($t_{sc}$) (step 826), and the most recent touch data and the force data having a time stamp equal to the time at which the countdown timer last expired less the time correction factor (Y) is selected and provided as input for further processing, e.g., in the click/unclick input process (step 828).

When the countdown counter is greater than zero (step 822) and the timer has expired, neither the touch data nor force data being processed by the processor 102 reflects new (or changed) sensor data. However, due to delays in the operating system 146 receiving sensor data, in particular the touch data from the touch-sensitive display 118, the processor 102 continues to process and await new sensor data until all sensor data delayed due to this latency has been processed. This is why the timer is restarted in the manner described. However, when the countdown counter is zero (step 822), all delayed sensor data has been processed and the timer expiry processing thread 729 can end since there is no new touch data or force data.

When the new event is the completion of a read/scan of the touch-sensitive display 118 (step 834), the touchscreen read complete processing thread 724 is executed. The touchscreen read complete processing thread 724 is triggered by the communication bus 730 when the reading of the touch-sensitive display 118 is complete. In the touchscreen read complete processing thread 724, the new touch data is stored with the time stamp ($TS_{TS}$) from the touchscreen ISR 712 (step 836). Next, the touch data and the force data having a time stamp equal to the time stamp for the most recent touch data less the time correction factor (Y) is matched/selected. This is the touch data and time stamp which was just stored. The matched touch data and force data is then output to input processing operations, for example, for registering an input using the click/unclick input process (step 838).

When the new event is the completion of a force sensor read/scan (step 844), the force sensor read complete processing thread 728 is executed. The force sensor read complete processing thread 728 is triggered by the communication bus 730 when the reading of the force sensor 122 is complete. In the force sensor read complete processing thread 728, the new force data is stored with the time stamp ($TS_{TS}$) from the force sensor ISR 714 (step 846). Since new force data cannot trigger a new click/unclick event alone, the force sensor read complete processing thread 728 ends.

While the process 800 has been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

While described primarily in the context of the low reporting modem it will be appreciated that the method of synchronizing force data with touch data described herein may be applied to full reporting modes as well as to the low reporting modes. In both reporting modes, there is a need to synchronize force data reported by the force sensor 122 with the touch data reported by the touch-sensitive display 118 because the reported sensor data is out of time. However, low reporting has the additional advantage of reducing data traffic on the communications bus 730, as well as avoiding additional latency problems and other problems associated with full reporting. The low reporting mode also offers energy savings by not reading touch data or force data unless there is a change in state of the respective sensors. Thus, the processor 102 is not interrupted all of the time. Instead, the processor 102 is only interrupted when there is new (changed) force data or touch data. The reduction in interrupts also allows the processor 102 to enter power saving modes and reduces the demand on processing resources since the processor 102 is not required to service interrupts that contain no new force data or touch data. Since the touch-sensitive display 118 and force sensors 122 will often have no changes to report, these savings can be significant.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of synchronizing data acquisition in a portable electronic device comprising a touch-sensitive display and a force sensing transducer, the method comprising:
    detecting, by the touch-sensitive display, touch events on the touch-sensitive display and storing touch data for each touch event with a time stamp for the touch event;
    detecting, by the force sensing transducer, force events caused by forces applied to the touch-sensitive display and storing force data for each force event with a time stamp for the force event;
    matching touch data for a particular touch event with force data for a force event corresponding to the particular touch event; and
    outputting the matched touch data and force data for input processing operations.

2. The method of claim 1, wherein touch data for the particular touch event is matched with force data having a time stamp equal to a reference time adjusted by a predetermined time correction factor (Y).

3. The method of claim 2, wherein a countdown timer is started or restated when each new touch event is detected and when each new force event is detected, wherein a countdown counter which defines the maximum number of times the countdown timer can expire is set or reset to a predetermined value (X) when each new touch event is detected and when each new force event is detected.

4. The method of claim 3, wherein the touch-sensitive display has a scan cycle longer than a scan cycle of a force sensing transducer which measures the forces and generates the force data, wherein the reference time is a time at which the countdown timer last expired when no touch event was detected in a last scan cycle of the touch-sensitive display, and wherein the predetermined time correction factor (Y) is deducted from the reference time.

5. The method of claim 4, wherein the reference time is a time of a time stamp of a new touch event detected in the last scan cycle of the touch-sensitive display.

6. The method of claim 5, wherein the countdown timer is started or restarted with a duration equal to a duration of the scan cycle of the touch-sensitive display ($t_{sc}$) plus a predetermined margin (Z).

7. The method of claim 4, wherein the countdown counter is decremented by one each time the countdown timer expires.

8. The method of claim 4, wherein the predetermined time correction factor is equal to twice the duration of the scan cycle of the touch-sensitive display ($t_{sc}$).

9. The method of claim 1, wherein touch events are detected by interrupt signals generated by the touch-sensitive display when a change greater than a predetermined threshold occurs on a touch-sensitive overlay of the touch-sensitive display.

10. The method of claim 1, wherein force events are detected by interrupt signals generated by a force sensing transducer measuring forces applied to the touch-sensitive display when a force greater than a predetermined force threshold is applied to the touch-sensitive display.

11. The method of claim 1, wherein the input processing operations comprise registering an input in accordance with the matched touch data and force data.

12. The method of claim 11, wherein the input is a click input or an unclick input, or a selection or deselection input.

13. The method of claim 11, further comprising:
causing movement of the touch-sensitive display relative to a device housing which simulates the collapse of a dome-type switch in response to registering an input.

14. The method of claim 13, wherein the portable electronic device comprises at least one piezoelectric element resiliently biased and located beneath a back side of the touch-sensitive display opposite to a touch-sensitive overlay of the touch-sensitive display, the movement of the touch-sensitive display being caused by modulating a charge of the piezoelectric element thereby providing haptic feedback which simulates the collapse of a dome-type switch.

15. A portable electronic device, comprising:
a housing;
a controller received within the housing;
a touch-sensitive display having a touch-sensitive overlay, the touch-sensitive display being mechanically constrained by the housing; and
at least one force sensing transducer located below the touch-sensitive display on an opposite side to the touch-sensitive overlay, the at least one force sensing transducer being connected to the controller and measuring forces applied to the touch-sensitive display;
wherein the controller is configured for: receiving notifications of touch events on a touch-sensitive display, detected by the touch-sensitive display, and storing touch data for each touch event with a time stamp for the touch event;
receiving notifications of force events, detected by the at least one force sensing transducer, caused by forces applied to the touch-sensitive display and storing force data for each force event with a time stamp for the force event;
matching touch data for a particular touch event with force data for a force event corresponding to the particular touch event; and outputting the matched touch data and force data for input processing operations.

16. The device of claim 15, wherein the input processing operations comprise registering an input in accordance with the matched touch data and force data.

17. The device of claim 16, wherein the input is a click input or an unclick input, or a selection or deselection input.

18. The device of claim 15, further comprising: a least one piezoelectric element connected to the controller, wherein the piezoelectric element is resiliently biased and located beneath a back side of the touch-sensitive display opposite to a touch-sensitive overlay of the touch-sensitive display, wherein the controller is configured for modulating a charge of the piezoelectric element thereby causing movement of the touch-sensitive display related to the housing and providing haptic feedback which simulates the collapse of a dome-type switch.

19. The device of claim 15, wherein the force sensing transducer is a force sensing resistor.

20. The device of claim 15, further comprising:
a plurality of force sensing transducers located beneath a back side of the touch-sensitive display opposite to the touch-sensitive overlay of the touch-sensitive display, the force sensing transducers measuring forces applied to the touch-sensitive overlay of the touch-sensitive display, wherein a sum of force data measured by the force sensing transducers is used to determine whether an applied force is greater than the predetermined force threshold; and
a plurality of piezoelectric elements resiliently biased and located beneath the back side of the touch-sensitive display opposite to the touch-sensitive overlay of the touch-sensitive display, wherein the controller is configured for modulating a charge of the piezoelectric elements thereby causing movement of the touch-sensitive display related to the housing and providing haptic feedback which simulates the collapse of a dome-type switch.

21. The device of claim 20, wherein the plurality of piezoelectric elements comprise four piezoelectric disks, each piezoelectric disk being located near a respective corner of the touch-sensitive display.

22. The device of claim 21, wherein the force sensing transducers comprise four force sensing resistors, each force sensing resistor being located near a respective corner of the touch-sensitive display.

23. A method of synchronizing force data with touch data of a portable electronic device comprising a touch-sensitive display and a force sensing transducer, the method comprising:
receiving an interrupt signal generated by the touch-sensitive display when a change greater than a predetermined threshold occurs on a touch-sensitive overlay of the touch-sensitive display;
generating a time stamp when the interrupt signal is received from the touch-sensitive display;
receiving an interrupt signal generated by the force sensing transducer when a force greater than a predetermined force threshold is applied to the touch- sensitive display;
generating a time stamp when the interrupt signal is received from the force sensing transducer;
synchronizing touch data for a particular touch event with force data for a force event corresponding to the particular touch event;
outputting the synchronized touch data and force data to input processing operations.

24. The method of claim 23, wherein touch data for the particular touch event is synchronized with force data having a time stamp equal to a reference time adjusted by a predetermined time correction factor (Y).

25. The method of claim 24, wherein the reference time is a time stamp of the particular touch event.

26. The method of claim 24, wherein a countdown timer is started or restarted when each new touch event is detected and when each new force event is detected, wherein a countdown counter which defines the maximum number of times the countdown timer can expire is set or reset to a predetermined value (X) when each new touch event is detected and when each new force event is detected.

27. The method of claim 26, wherein the touch-sensitive display has a scan cycle longer than a scan cycle of a force sensing transducer which measures the forces and generates the force data, wherein the reference time is a time at which the countdown timer last expired when no touch event was detected in a last scan cycle of the touch-sensitive display, and wherein the predetermined time correction factor (Y) is deducted from the reference time.

28. The method of claim 27, wherein the reference time is a time of a time stamp of a new touch event detected in the last scan cycle of the touch-sensitive display.

29. The method of claim 27, wherein the countdown timer is started or restarted with a duration equal to a duration of the scan cycle of the touch-sensitive display ($t_{sc}$) plus a predetermined margin (Z).

30. The method of claim 27, wherein the countdown counter is decremented by one each time the countdown timer expires.

31. The method of claim 27, wherein the predetermined time correction factor is equal to twice the duration of the scan cycle of the touch-sensitive display ($t_{sc}$).

32. The method of claim 23, wherein the input processing operations comprise registering an input in accordance with the synchronized touch data and force data.

33. The method of claim 32, wherein the input is a click input or an unclick input, or a selection or deselection input.

34. The method of claim 32, further comprising:
causing movement of the touch-sensitive display relative to a device housing which simulates the collapse of a dome-type switch in response to registering an input.

35. The method of claim 34, wherein the portable electronic device comprises at least one piezoelectric element resiliently biased and located beneath a back side of the touch-sensitive display opposite to a touch-sensitive overlay of the touch-sensitive display the movement of the touch-sensitive display being caused by modulating a charge of the piezoelectric element thereby providing haptic feedback which simulates the collapse of a dome-type switch.

36. The method of claim 23, further comprising:
generating the interrupt signal by the touch-sensitive display when a change greater than a predetermined threshold occurs on a touch-sensitive overlay of the touch-sensitive display; and
generating the interrupt signal by the force sensing transducer when a force greater than a predetermined force threshold is applied to the touch-sensitive display.

37. A portable electronic device having a device housing in which a controller is received and which mechanically constrains a touch-sensitive display and a force sensing transducer each connected to the controller, the controller being configured to:
receive an interrupt signal generated by the touch-sensitive display when a change greater than a predetermined threshold occurs on a touch-sensitive overlay of the touch-sensitive display;
generate a time stamp when the interrupt signal is received from the touch- sensitive display;
receive an interrupt signal generated by the force sensing transducer when a force greater than a predetermined force threshold is applied to the touch-sensitive display;
generate a time stamp when the interrupt signal is received from the force sensing transducer;
synchronize touch data for a particular touch event with force data for a force event corresponding to the particular touch event;
output the synchronized touch data and force data to input processing operations.

* * * * *